United States Patent [19]
DeKleine et al.

[11] Patent Number: 5,390,096
[45] Date of Patent: Feb. 14, 1995

[54] REPLACEMENT COMPACT FLUORESCENT LAMP ASSEMBLY

[75] Inventors: Paul C. DeKleine; Rick A. Perkins, both of Holland, Mich.

[73] Assignee: Progressive Technology in Lighting, Inc., Holland, Mich.

[21] Appl. No.: 7,508

[22] Filed: Jan. 22, 1993

Related U.S. Application Data

[63] Continuation-in-part of Ser. No. 964,928, Oct. 22, 1992.

[51] Int. Cl.6 .................................................. F21V 7/00
[52] U.S. Cl. ..................... 362/346; 362/260; 362/294; 362/264; 362/310; 362/373; 315/56; 315/71
[58] Field of Search .............. 362/346, 218, 260, 294, 362/222, 264, 310, 373; 315/58, 239, 57, 53, 218

[56] References Cited

U.S. PATENT DOCUMENTS

| | | | |
|---|---|---|---|
| 2,505,993 | 5/1950 | Rogers | 315/58 |
| 3,551,736 | 12/1970 | Doehner | 315/100 |
| 3,611,009 | 10/1971 | McNeil | 315/57 |
| 3,815,080 | 6/1974 | Summa | 315/57 X |
| 4,093,893 | 6/1978 | Anderson | 315/48 |
| 4,173,730 | 11/1979 | Young et al. | 315/53 |
| 4,270,071 | 5/1981 | Morton | 315/62 |
| 4,337,414 | 6/1982 | Young | 315/56 |
| 4,347,460 | 8/1982 | Latassa et al. | 315/63 |
| 4,375,607 | 3/1983 | Morton et al. | 315/56 |
| 4,405,877 | 9/1983 | Haraden et al. | 313/318 |
| 4,414,489 | 11/1983 | Young | 315/51 |
| 4,443,778 | 4/1984 | Mewissen | 336/90 |
| 4,449,071 | 5/1984 | Yokoyama | 315/53 |
| 4,449,072 | 5/1984 | Osada | 315/58 |
| 4,456,854 | 6/1984 | Osada et al. | 315/58 |
| 4,570,105 | 2/1986 | Engel | 315/58 |
| 4,623,823 | 11/1986 | Engel | 315/58 |
| 4,746,840 | 5/1988 | Lim | 315/58 |
| 4,748,380 | 5/1988 | MacDonald et al. | 315/57 |
| 4,750,096 | 6/1988 | Lim | 362/218 |
| 4,841,193 | 6/1989 | Nakamura et al. | 313/318 |
| 5,030,889 | 7/1991 | El-Hamamsy et al. | 315/200 R |
| 5,128,590 | 7/1992 | Holzer | 315/58 |
| 5,179,323 | 1/1993 | Ham | 315/239 |

FOREIGN PATENT DOCUMENTS

| 2281539 | 7/1974 | France . |
| 239669 | 10/1911 | Germany . |

OTHER PUBLICATIONS

Drawings of a compact fluorescent lamp adapter assembly on sale in U.S.A. for more than one year prior to the filing of the present application.

The Specification Sheet for PL Adapter by North American Philips Lighting Corporation, published in the USA in 1983.

*Primary Examiner*—Larry Jones
*Attorney, Agent, or Firm*—Price, Heneveld, Cooper, DeWitt & Litton

[57] ABSTRACT

A replacement fluorescent lighting adaptor for adapting a fluorescent lamp to an incandescent lamp connector includes a base defined by an annular inner wall and an annular outer wall surrounding the inner wall and spaced from the inner wall defining a cavity. The inner wall includes a contact assembly for making electrical contact with the fluorescent lamp contacts and a portion to receive the fluorescent lamp base. A reflector including a narrow neck portion and a longitudinally, outwardly expanding portion is fitted to the base receiving portion by the narrow neck portion. The cavity includes a first cavity portion between the lamp base-receiving portion and the outer wall in which an annular electrical ballast member is positioned. The outer wall is spaced from the reflector in order to improve heat dissipation of the electrical ballast. An annular capacitive device is positioned in a second cavity portion between the contact assembly and the outer wall.

23 Claims, 5 Drawing Sheets

REPLACEMENT COMPACT FLUORESCENT LAMP ASSEMBLY

CROSS-REFERENCE TO RELATED APPLICATIONS

This application is a continuation-in-part of application Ser. No. 07/964,928, filed Oct. 22, 1992, by Paul C. DeKleine and Rick A. Perkins, for a COMPACT FLUORESCENT LAMP REFLECTOR.

BACKGROUND OF THE INVENTION

This invention relates generally to a fluorescent lighting fixture and, in particular, to a replacement lighting adaptor for adapting a fluorescent lamp to an incandescent lamp connector.

Compact fluorescent lamps are widely used as an energy efficient substitute for conventional incandescent lamps. A four-tube compact fluorescent lamp, commonly referred to as a "quad-lamp," is capable of producing, with between 9 watts and 13 watts, the equivalent lumens of an incandescent lamp of much higher wattage. In order to provide replacements for incandescent spotlights and floodlights, it is known to package a compact fluorescent lamp with its required magnetic ballast within a housing having a reflective surface and covered by a lens. One application for such replacement of a fluorescent lighting device is within a housing recessed within a ceiling. Another application is engagement with a surface-mounted incandescent lamp holder.

A problem with such replacement fluorescent lighting adaptors is meeting the dimensional constraints imposed by the incandescent lamp holders and fixtures to which they are applied. One such dimensional constraint is the maximum overall length, or MOL, of the replacement fluorescent lighting adaptor. The acceptable MOL is strictly limited by the dimensional constraints of existing fixtures, such as recessed ceiling lights. In order to reduce MOL, it is well known to position the magnetic ballast around the contact portion of the fluorescent lamp. The problem with this approach is that, in order to utilize such a design to reduce MOL, it is necessary to enlarge the diameter of the replacement fluorescent lighting adaptor housing adjacent the threaded Edison contact assembly which is the portion which threadably engages conventional incandescent light sockets. This increase in diameter may preclude the use of such a replacement fluorescent lighting adaptor in conventional surface-mounted incandescent spotlight and floodlight housings. Such housings typically have a narrow portion adjacent the threaded contacts or Edison base.

An additional demand placed upon the design of replacement fluorescent lighting adaptors is the desire to provide a power-factor correcting device, namely a capacitive device, in the lighting adaptor housing in order to correct a lagging power factor created by the magnetic ballast. In order to be effective, such capacitor must be of sufficient capacity and be capable of operation at high voltage AC. Such capacitors tend to be of significant size. Another consideration in the design of replacement fluorescent lighting adaptors is the undesirable effect of heat generated by the magnetic ballast upon the efficient operation of the fluorescent lamp. Such fluorescent lamps are less efficient and produce less light output at elevated temperatures.

SUMMARY OF THE INVENTION

The present invention provides a replacement fluorescent lighting adaptor for adapting a fluorescent lamp to an incandescent lamp connector. The invention is intended to reduce the maximum overall length of the lighting adaptor without increasing the diameter of the lighting adaptor in the critical neck area adjacent the Edison base. This is accomplished, according to the invention, in a manner which reduces the amount of heat coupled from the magnetic ballast to the fluorescent lamp. The invention further provides means for accommodating a power-factor correcting capacitive device in a manner which is not inconsistent with the above objectives.

A replacement fluorescent lighting adaptor, according to the invention, includes a reflector body including an outwardly opening annular wall having a reflecting inner surface. A base extends from an inward end of the reflector annular wall and includes a first contact assembly adapted to electrically connecting with electrical contacts of a fluorescent lamp positioned with its light generating tube within the reflector. The base further includes a second contact assembly adapted to electrically connecting with an incandescent lamp connector. The replacement fluorescent lighting adaptor further includes an annular ballast member electrically connecting with the first and second contact assemblies and extending around a portion of the reflector outwardly of the base. According to another aspect of the invention, an annular capacitive device may be positioned within the base and extending around a portion of the first contact assembly. In this manner, the capacitive device does not add to the maximum overall length of the adaptor and does not add significantly to the diameter of the adaptor in the critical area adjacent the second contact assembly.

These and other objects, advantages and features of this invention will become apparent upon review of the following specification in conjunction with the drawings.

DESCRIPTION OF THE PREFERRED EMBODIMENT

Figure 1:
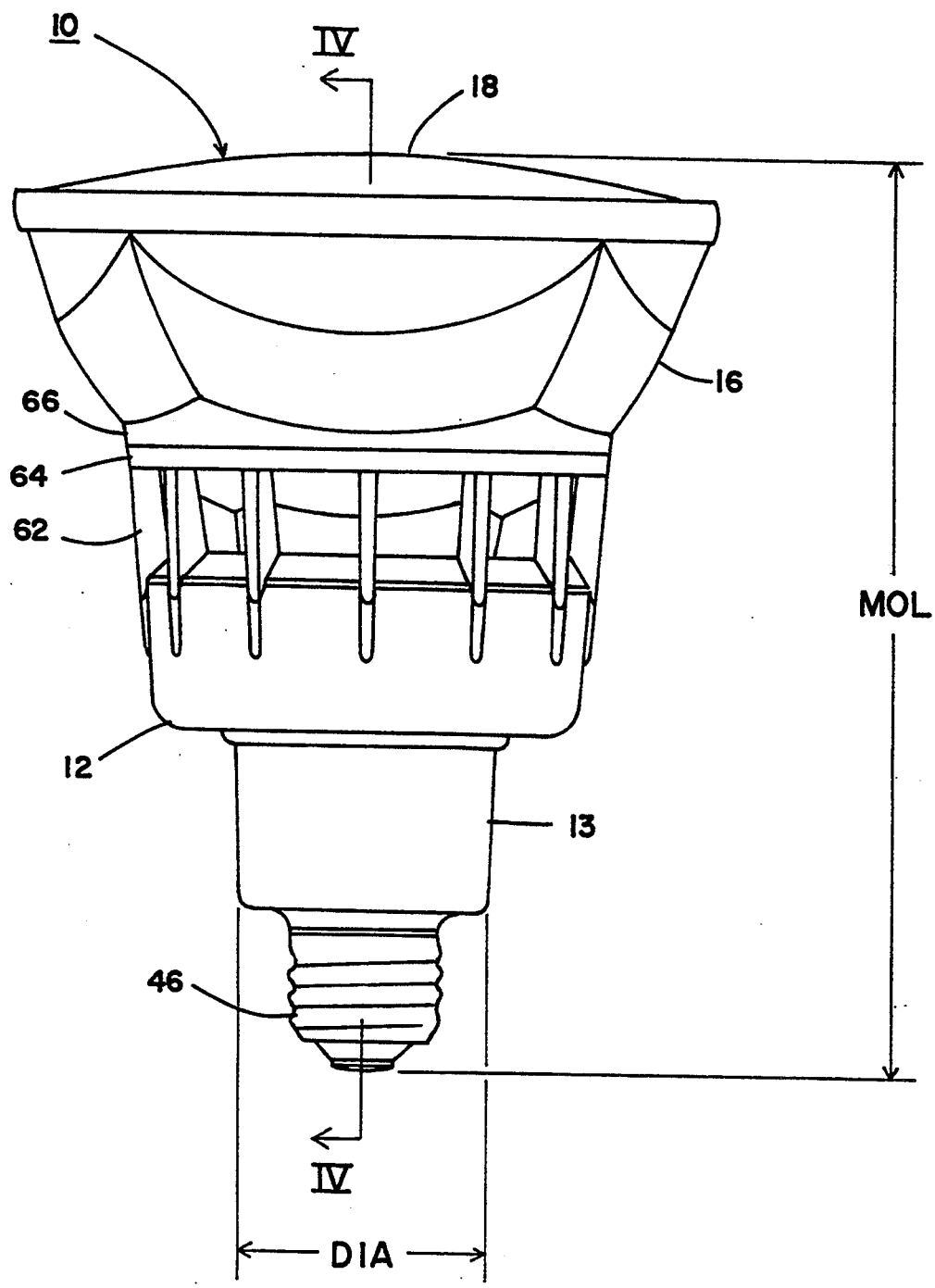
FIG. 1 is a side elevation of a replacement fluorescent lighting adaptor according to the invention.
Figure 2:
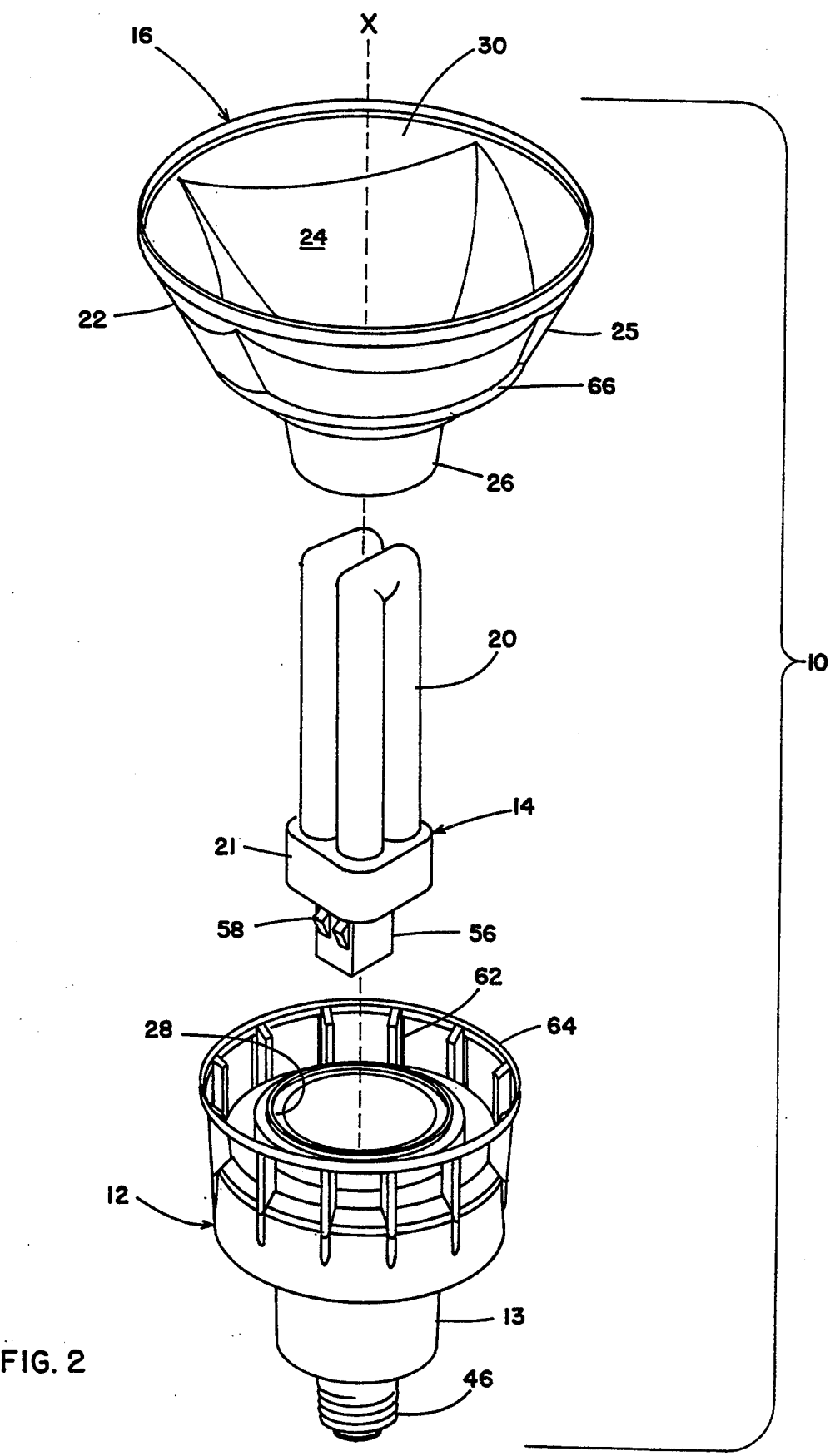
FIG. 2 is an exploded perspective view of the lighting adaptor in FIG. 1.
Figure 3:
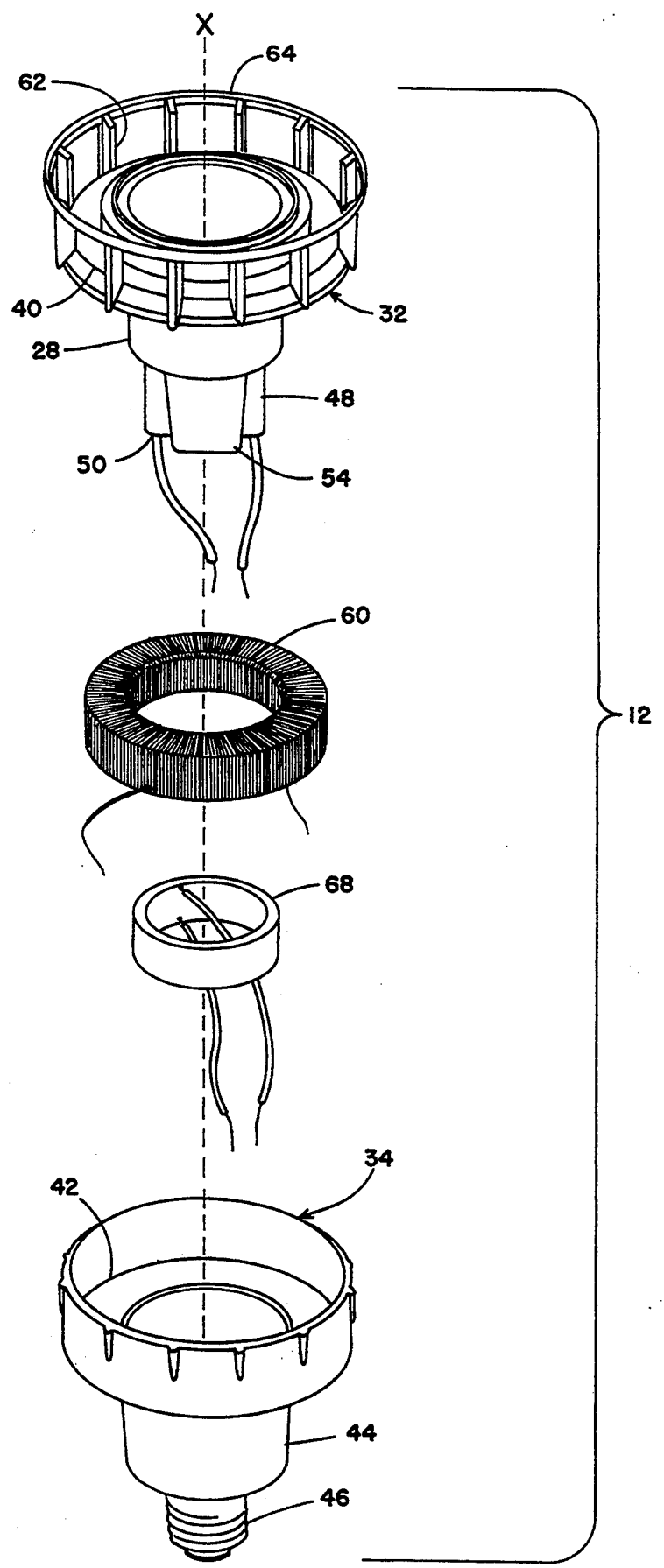
FIG. 3 is an exploded perspective view of a lighting adaptor base, including an annular ballast member and an annular capacitive device.
Figure 4:
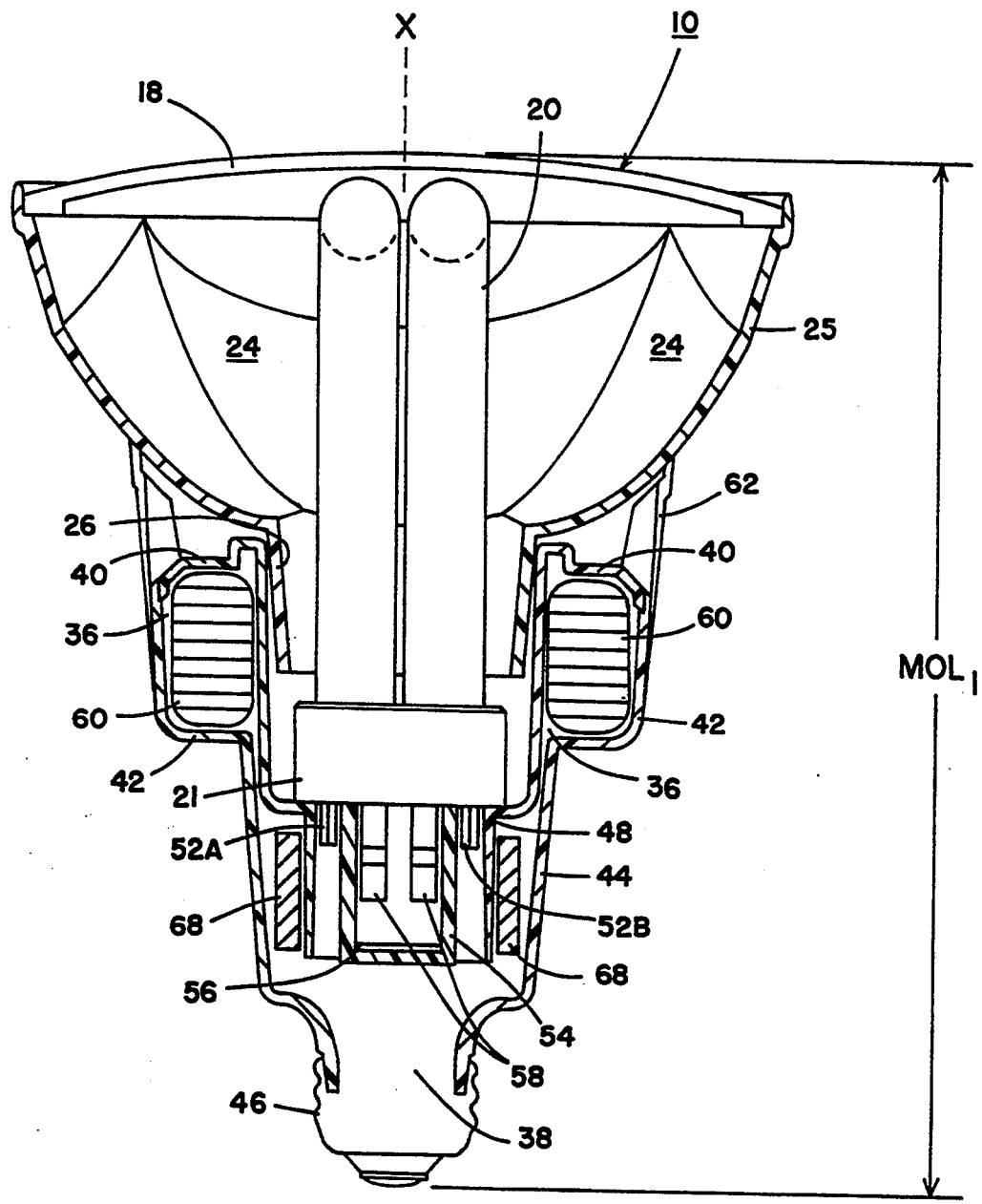
FIG. 4 is a sectional view taken along the lines IV—IV in FIG. 1.

Referring now specifically to the drawings, and the illustrative embodiments depicted therein, a replacement fluorescent lighting adaptor 10 includes a base 12 to which a conventional four-tube compact fluorescent lamp 14 is mounted, a reflector 16 mounted to base 12 and encircling fluorescent lamp 14, and an optional lens 18 covering reflector 16 (FIGS. 1 and 2). Lamp 14 is a conventional compact fluorescent lamp, which is available in 9-watt capacity and 13-watt capacity. Such lamps are sold by North American Philips Lighting Corporation under Model No. PL. Optional lens 18 may be relatively clear in order to retain the light reflected by reflector 16 collimated in a beam to thereby make lighting adaptor 10 a spotlight. Lens 18 may, alternatively, contain stipples (not shown) in order to diffuse the light reflected by reflector 16, thereby making lighting adaptor 10 a floodlight. Lamp 14 includes four tubes 20, which are elongated along the longitudinal axis of adaptor 10, illustrated in FIGS. 2-5 as axis X.

Reflector 16, in the illustrated embodiment, includes a body 22 having a reflective inner surface 24 annularly surrounding tubes 20. Reflective surface 24 is defined by a plurality of geometrically related surface portions as disclosed in detail in co-pending U.S. patent application Ser. No. 07/964,928, filed Oct. 22, 1992, by the present inventors for a COMPACT FLUORESCENT LAMP REFLECTOR, the disclosure of which is hereby incorporated herein by reference. Body 22 includes a lower narrow neck portion 26, which removably locks with an annular inner wall 28 defining a central opening in base 12. Body 22 opens outwardly from neck portion 26 to an outwardly expanding opening 30, which is optionally covered by lens 18.

Base 12 includes an inner housing member 32 and an outer housing member 34. Inner housing portion 32 is nested within outer housing portion 34 in order to define a first cavity portion 36 and a second cavity portion 38 between the housing members. First cavity portion 36 is enclosed by annular wall 28, an annular flange 40 extending on inner housing portion 32 perpendicularly from annular wall 28, and a turned annular flange 42 on outer housing portion 34. Second cavity portion 38 is surrounded by an annular wall 44 of outer housing portion 34 and enclosed inwardly by a contact assembly 46 adapted to threadably contacting an incandescent lamp receptacle. Contact assembly 46 is commonly referred to as an "Edison base." Second cavity portion 38 is enclosed longitudinally outwardly by a wall 48, which mounts a second contact assembly, generally referred to at 50, which protrudes into cavity portion 38. Contact assembly 50 includes a pair of electrical contacts 52a, 52b, which engage contacts extending from a base portion 21 of lamp 14. Wall 48 includes a recessed portion 54 protruding into second cavity portion 38 and dimensioned to receive a standard starter housing portion 56 of lamp base 21. Starter housing 56 is a conventional appendage of fluorescent lamp 14 and includes detents 58 in order to retain housing 56 within recess portion 54, as well as to position a starter device for lamp 14.

An annular magnetic ballast 60 is positioned within first cavity portion 36. In this manner, ballast 60 surrounds tubes 20 of fluorescent lamp 14. Ballast 60, in this manner, is sufficiently spaced away from contact assembly 46 in order to allow a reduced diameter (DIA) of neck portion 13 of base 12 (FIG. 1). With this configuration, DIA may be made sufficiently small to be received within conventional surface mount fixtures for incandescent floodlights and spotlights. However, the ballast does not contribute to any increase in the maximum overall length (MOL) of lighting adaptor 10. Furthermore, annual flange 40 is longitudinally spaced away from the enlarged portion 25 of reflector 16. This allows heat dissipation of ballast 60 by surrounding the ballast with three exposed sides defined by annular flange 40 and the two perpendicular surfaces of turned annular flange 42. A plurality of support posts 62 extend between annular flange 40 and a flange 64, which mates with a flange 66 defined on reflector body 22 (FIG. 1).

Because support posts 62 are radially spaced, they do not interfere with ventilation for dissipation of heat from ballast 60. In the illustrated embodiment, magnetic ballast 60 is a conventional inductor wound around a stacked laminator core and may be of a toroidal shape, a square shape, a split-C shape or a double-L shape.

In order to correct the lagging power factor created by the use of magnetic ballast 60, a power-factor correcting capacitive device 68 is provided. Capacitive device 68, in the illustrative embodiment, is annular in shape and fits within second cavity portion 38 between annular wall 44 and wall 48. It has been discovered that this configuration accommodates the relatively large capacitance value and voltage rating of capacitive device 68 without significantly increasing the MOL or DIA of lighting adaptor 10. In the illustrated embodiment, capacitive device 68 is a 3.8 microfarad foil-capacitor having a voltage rating sufficiently high to be placed directly across this high voltage AC supplied by an incandescent lamp socket. Such capacitance device is capable of improving the power factor of light adaptor 10 from approximately 0.5 to approximately 0.9.

Figure 5:
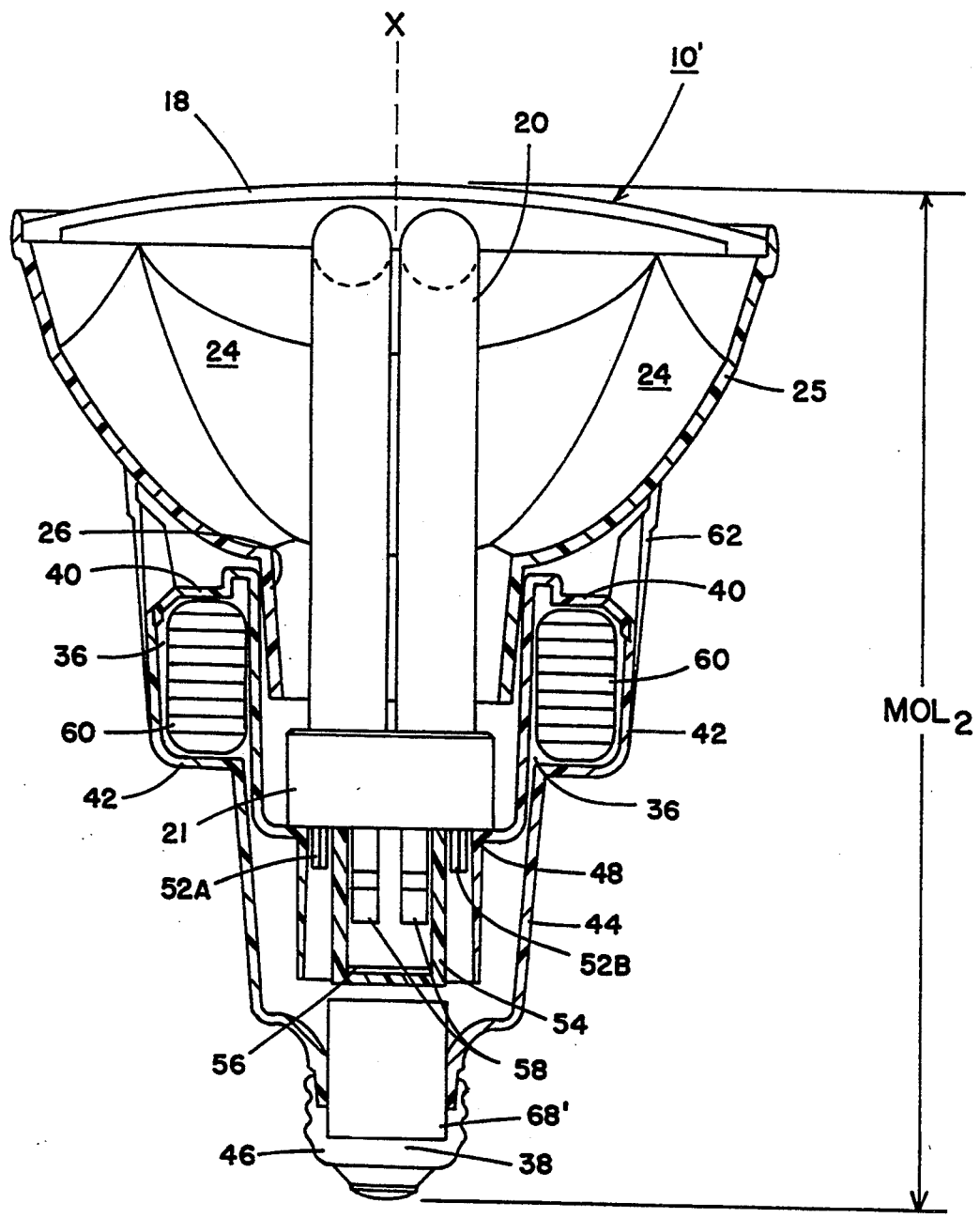
FIG. 5 is the same view as FIG. 4 of all alternative embodiment of the invention.

Alternatively, a replacement fluorescent lighting adaptor 10' may include a capacitive device 68' positioned within the lower portion of cavity portion 38 surrounded by contact assembly 46, as illustrated in FIG. 5. While the $MOL_2$ of replacement fluorescent lighting adaptor 10' is marginally greater than the $MOL_1$ of lighting adaptor 10, this may be a reasonable trade-off for the reduced cost of a more conventionally available capacitive device 68'. As would be understood by those skilled in the art, capacitive device 68 is connected to, and parallel with, the contacts of contact assembly 46. Magnetic ballast 60 includes an inductive device connected in series between one contact of contact assembly 46 and one contact of contact assembly 50 with the other contact of contact assembly 46 connected directly with the other contact of contact assembly 50.

As illustrated in FIG. 2, reflector 16 may be removed from base 12 by disengaging a separable fastening means, such as a twist-lock connector (not shown), in order to provide access to fluorescent lamp 14 in order to replace the lamp. Inner housing portion 32 and outer housing portion 34 are made from conventional polymeric materials, which are fused as by sonic welding or other conventional techniques in order to form a unitary assembly for the life of the lighting adaptor. Reflector body 22 may also be made from a polymeric material and coated with a high reflectance material in order to form reflecting surface 24, as is well known in the art.

It is seen that the present invention provides a replacement fluorescent lighting adaptor having a reduced maximum overall length without a commensurate increase in the diameter of the base neck portion adjacent the threaded Edison contacts. The positioning of the magnetic ballast advantageously provides convection cooling of the ballast in order to reduce the amount of heating of fluorescent lamp 14 as a result of heat generated by the magnetic ballast. This provides a relatively inexpensive, yet efficient, fluorescent lighting adaptor. The invention further provides a power-factor correcting capacitive device without adding significantly to the maximum overall length or the neck diameter of the base.

Changes and modifications in the specifically described embodiments can be carried out without departing from the principles of the invention which is intended to be limited only by the scope of the appended claims, as interpreted according to principles of patent law including the Doctrine of Equivalents.

The embodiments of the invention in which an exclusive property or privilege is claimed are defined as follows:

1. A replacement fluorescent lighting adaptor for adapting a fluorescent lamp to an incandescent lamp connector, said fluorescent lamp having a light generating tube, a base and electrical contacts on said base, comprising:

a housing having an annular wall extending around an axis of elongation;

said housing having a first outer longitudinal portion defined by said annular wall, an opposite second outer longitudinal portion defined by said annular wall, and a middle longitudinal portion defined by said annular wall and between said first and second outer longitudinal portions along said axis of elongation;

said first outer longitudinal portion including a reflective inner surface of said annular wall defining a light reflector;

said second outer longitudinal portion including a first contact assembly adapted to electrically connecting with incandescent lamp connector and a second contact assembly adapted to electrically connecting with contacts of a fluorescent lamp;

said middle longitudinal portion including a cavity defined by a cavity defining portion of said annular wall and an electrical ballast in said cavity, said ballast being electrically connected with said first and second connector assemblies; and wherein said cavity defining portion of said annular wall is spaced from said first outer longitudinal portion of said housing in order to provide heat radiation surfaces on three sides of said cavity defining portion of said annular wall.

2. The lighting adaptor in claim 1 further including an annular capacitive device electrically connected with at least one of said first and second contact assemblies and positioned in said second outer longitudinal portion.

3. The lighting adaptor in claim 2 wherein said capacitive device extends around a portion of said first contact assembly.

4. The lighting adaptor in claim 3 wherein said capacitive device is a foil capacitor.

5. The lighting adaptor in claim 2 wherein said capacitive device is a foil capacitor.

6. The lighting adaptor in claim 1 including support posts extending between said cavity defining portion of said annular wall and said first outer longitudinal portion of said housing.

7. A replacement fluorescent lighting adaptor for adapting a fluorescent lamp to an incandescent lamp connector, said fluorescent lamp having a light generating tube, a base and electrical contacts on said base, comprising:

a housing having an annular wall extending around an axis of elongation;

said housing having a first outer longitudinal portion defined by said annular wall, an opposite second outer longitudinal portion defined by said annular wall, and a middle longitudinal portion defined by said annular wall and between said first and second outer longitudinal portions along said axis of elongation;

said first outer longitudinal portion including a reflective inner surface of said annular wall defining a light reflector;

said second outer longitudinal portion including a first contact assembly adapted to electrically connecting with an incandescent lamp connector and a second contact assembly adapted to electrically connecting with contacts of a fluorescent lamp;

said middle longitudinal portion including a cavity defined by a cavity defining portion of said annular wall and an electrical ballast in said cavity, said ballast being electrically connected with said first and second connector assemblies; and an annular capacitive device electrically connected with one of said first and second contact assemblies and positioned in said second longitudinally extending portion of said housing.

8. The lighting adaptor in claim 7 wherein said capacitive device extends around a portion of said second contact assembly.

9. A replacement fluorescent lighting adaptor for adapting a fluorescent lamp to an incandescent lamp connector, said fluorescent lamp having a light generating tube, a base and electrical contacts on said base, comprising:

a housing having an annular wall extending around an axis of elongation;

said housing having a first outer longitudinal portion defined by said annular wall, an opposite second outer longitudinal portion defined by said annular wall, and a middle longitudinal portion defined by said annular wall and between said first and second outer longitudinal portions along said axis of elongation;

said first outer longitudinal portion including a reflective inner surface of said annular wall defining a light reflector;

said second outer longitudinal portion including a first cavity defined by said annular wall, a first contact assembly adapted to electrically connecting with an incandescent lamp connector at an outer longitudinal end of said first cavity, a second contact assembly adapted to electrically connecting with contacts of a fluorescent lamp at an inner longitudinal end of said first cavity, and a capacitive device in said first cavity; and said middle longitudinal portion including a second cavity defined by a cavity defining portion of said annular wall and an electrical ballast in said second cavity, said ballast and said capacitive device being electrically connected with at least one of said first and second contact assemblies.

10. The lighting adaptor in claim 9 wherein said first contact assembly includes first and second electrical contacts, said second contact assembly includes third and fourth electrical contacts, said electrical ballast is connected in electrical series connection with said first and said third electrical contacts and said capacitive device is connected in electrical parallel connection with said first and second electrical contacts.

11. The lighting adaptor in claim 9 wherein said capacitive device is cylindrical in shape defining a central opening therein.

12. The lighting adaptor in claim 11 wherein said inner longitudinal end of said first cavity includes a recessed wall portion that extends within said central opening of said capacitive device.

13. The lighting adaptor in claim 11 wherein said capacitive device is a foil capacitor.

14. The lighting adaptor in claim 11 wherein said second cavity and said ballast are cylindrical in shape defining a central opening in each of said second cavity and said ballast.

15. The lighting adaptor in claim 14 wherein said central opening of said second cavity defines another reflective surface that extends longitudinally inwardly from said light reflector.

16. The lighting adaptor in claim 9 wherein said second cavity and said ballast are cylindrical in shape defining a central opening in each of said second cavity and said ballast.

17. The lighting adaptor in claim 16 wherein said central opening of said second cavity defines another reflective surface that extends longitudinally inwardly from said light reflector.

18. A replacement fluorescent lighting adaptor for adapting a fluorescent lamp to an incandescent lamp connector, said fluorescent lamp having a light generating tube, a base and electrical contacts on said base, comprising:

a base defined by an annular inner wall and an annular outer wall surrounding said inner wall and spaced from said inner wall defining a cavity;

said inner wall defining a contact assembly adapted to electrically connecting with fluorescent lamp contacts and a base receiving portion adapted to receiving a fluorescent lamp base;

said cavity including a first cavity portion between said base receiving portion and said outer wall and a second cavity portion between said contact assembly and said outer wall;

a reflector including a narrow neck portion and a longitudinally outwardly expanding portion, said narrow neck portion adapted to fitting with said base receiving portion;

an annular electrical ballast member in said first cavity portion;

wherein said outer wall is spaced from said longitudinally outwardly expanding portion of said reflector to improve heat dissipation of said electrical ballast; and an aperture support wall extending between said outer wall and said longitudinally outwardly expanding portion of said reflector.

19. The lighting adaptor in claim 18 including fastening means for removably retaining said reflector narrow neck portion with said base receiving portion to allow replacement of a fluorescent lamp base in said base receiving portion.

20. The lighting adaptor in claim 18 including an annular capacitive device in said second cavity portion.

21. The lighting adaptor in claim 20 wherein said capacitive device surrounds said contact assembly.

22. The lighting adaptor in claim 20 wherein said capacitive device is a foil capacitor.

23. The lighting adaptor in claim 18 including a capacitive device in said second cavity portion.

* * * * *